(12) United States Patent
Kim

(10) Patent No.: US 10,564,405 B2
(45) Date of Patent: Feb. 18, 2020

(54) SUPER WIDE-ANGLE OPTICAL SYSTEM

(71) Applicant: Samsung Electronics Co., Ltd., Gyeonggi-do (KR)

(72) Inventor: Jin-Woo Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 51 days.

(21) Appl. No.: 15/743,932

(22) PCT Filed: Sep. 2, 2016

(86) PCT No.: PCT/KR2016/009861
§ 371 (c)(1),
(2) Date: Jan. 11, 2018

(87) PCT Pub. No.: WO2017/039396
PCT Pub. Date: Mar. 9, 2017

(65) Prior Publication Data
US 2018/0203211 A1 Jul. 19, 2018

(30) Foreign Application Priority Data

Sep. 4, 2015 (KR) .................. 10-2015-0125866

(51) Int. Cl.
*G02B 9/04* (2006.01)
*G02B 13/06* (2006.01)
(52) U.S. Cl.
CPC .............. *G02B 13/06* (2013.01); *G02B 9/04* (2013.01)
(58) Field of Classification Search
CPC . G02B 13/06; G02B 9/64; G02B 9/04; G02B 13/0045
See application file for complete search history.

(56) References Cited

U.S. PATENT DOCUMENTS 6,456,442 B1 9/2002 Enomoto
8,441,746 B2 5/2013 Hsieh et al.
(Continued)

FOREIGN PATENT DOCUMENTS

JP 2000-035537 A 2/2000
JP 2001-042219 A 2/2001
(Continued)

OTHER PUBLICATIONS

Gross, Herbert; Handbook of Optical Systems, vol. 3: Aberration Theory and Correction of Optical Systems; 2007; Chapter 31.
(Continued)

*Primary Examiner* — Joseph P Martinez
(74) *Attorney, Agent, or Firm* — Cha + Reiter, LLC

(57) ABSTRACT

A super wide angle optical system, according to various embodiments of the present invention, comprises: a first lens group including a negative refractive power, and a second lens group including a positive refractive power, in order from an object side; and a device for limiting the size of an aperture or light flux between the first lens group and the second lens group, wherein the first lens group comprises, in order, from the object: a plurality of meniscus lenses which are convex towards the object; a meniscus lens which is concave towards the object next to the meniscus lenses, wherein a lens, which is closest to an image in the first lens group, comprises a positive lens, and wherein the second lens group comprises a cemented lens in which lenses respectively including positive and negative refractive powers are bonded in order from the object side, wherein a lens, which is closest to an image in the second lens group has a positive refractive power. In addition, the super wide-angle optical system may be configured in various manners according to embodiments.

6 Claims, 9 Drawing Sheets

(56) References Cited

U.S. PATENT DOCUMENTS

2002/0176176 A1    11/2002   Shinohara
2008/0074761 A1     3/2008   Yamakawa et al.
2013/0114150 A1     5/2013   Kwon

FOREIGN PATENT DOCUMENTS

| JP | 2008-076716 A | | 4/2008 | |
| --- | --- | --- | --- | --- |
| JP | 2008-292800 A | | 12/2008 | |
| JP | 2014-102291 A | | 6/2014 | |
| KR | 10-2007-0000679 A | | 1/2007 | |
| WO | 2010/077050 A2 | | 7/2010 | |
| WO | WO2010077050 | * | 7/2010 | ............. G02B 13/06 |

OTHER PUBLICATIONS

Gross, Herbert; Handbook of Optical Systems, vol. 4: Survey of Optical Instruments; 2008; pp. 338-346.
European Search Report dated Jul. 27, 2018.

\* cited by examiner

SUPER WIDE-ANGLE OPTICAL SYSTEM

CLAIM OF PRIORITY

This application is a National Phase Entry of PCT International Application No. PCT/KR2016/009861 which was filed on Sep. 2, 2016 and claims a priority to Korean Patent Application No. 10-2015-0125866, which was filed on Sep. 4, 2015 the contents of which are incorporated herein by reference.

TECHNICAL FIELD

The present disclosure relates to a super wide-angle optical system, and more particularly, to a super wide-angle optical system equipped with a super wide-angle lens having a field of view of 190° or more, which is capable of capturing a 360-degree omni-directional image.

BACKGROUND ART

In general, as mobile communication means such as mobile communication terminals, personal digital assistants (PDAs), and smartphones have been widespread and various services have been provided by communication technology, the mobile communication means have been equipped with various additional functions as well as basic communication functions.

Further, a conventional super wide-angle lens has a field of view equal to or less than 180°, and a diagonal corner of a sensor may have a maximum field of view in an optical system using a solid state imaging device such as a digital camera, a video camera, and surveillance equipment like a closed circuit television (CCTV).

DETAILED DESCRIPTION OF THE INVENTION

Technical Problem

Therefore, a general super wide-angle lens has limitations in acquiring an image perpendicular to an optical axis direction, which may make it difficult to acquire an omni-directional image. Moreover, since the lens is configured to have a field of view of 190° or more and a large diameter, aberration control may be limited. Particularly, a combination of positive and negative lenses in front of an aperture is not optimal in the lens configuration. As a result, it may be difficult to control an aberration due to a super wide angle and a large diameter.

For example, US 2013-0114150A1 entitled 'Super wide angle optical lens system' discloses a super wide-angle optical system having a first negative lens, a second negative lens, a third negative lens, a fourth positive lens, a fifth negative lens, and a sixth negative lens, arranged in order from an object side to an image side. The super wide-angle optical system is disclosed as having a full field of view of about 140° with a half field of view being about 70°. Therefore, the super wide-angle optical system does not obtain a field of view of about 190° to acquire an omni-directional image, and only negative lenses are configured in front of an aperture. As a result, aberration control is too restrictive to have a field of view of about 190°.

In addition, US 2012-0206822 entitled 'Wide angle photographic lens assembly' discloses a super wide-angle optical system having a first negative lens convex toward an object, a second positive lens concave toward the object, an aperture, and third and fourth positive lenses concave toward the object, arranged in order from an object side to an image side. Herein, a fifth lens has a negative refractive power, and a sixth lens has a positive refractive power. The optical system has a field of view of about 180.2°, and is relatively bright with an F number (Fno) of about 2.05. However, a single negative lens and a single positive lens are configured in front of the aperture, which leads to limitations in aberration control due to a wide angle. Thus, the super wide-angle optical system may secure a field of view which exceeds 180° but just by a little bit. Despite the advantage that the remaining lenses except for the first lens are made of plastic and thus are effective in terms of material cost, a temperature-incurred change may occur to an aberration and a focal position in view of the nature of the plastic lenses.

In addition, JP 2014-102291A entitled 'Wide-angle lens, capturing lens unit, capturing device, and information device' discloses a super wide-angle optical system having a first lens group having a negative refractive power, an aperture, and a second lens group arranged in order from an object side to an image side. The first lens group has an a negative meniscus lens, a second plastic lens having a negative refractive power, and a third lens having a positive refractive power, arranged in order from the object side to the image side. The second lens group includes a fourth positive lens, a fifth positive lens, a sixth negative lens, and a sixth plastic lens having a positive refractive power, arranged in order from the object side to the image side. The above technology has a field of view of about 180° and an FNO of about 2.8, which correspond to general fish-eye lens specifications. Although an image of about 180° may be acquired through this optical system, the field of view is so insufficient as to acquire an image perpendicular to an optical axis direction. Moreover, the lens has an FNO of about 2.8 as a brightness level. Thus, with the conventional structure, a field of view exceeding 180° and a bright lens may not be achieved.

Technical Solution

Accordingly, various embodiments of the present disclosure provide an omni-directional optical system which is capable of capturing an object in a direction perpendicular to an optical axis at a field of view of 190° or more, and thus capturing the object in the direction perpendicular to the optical axis at 360°.

Various embodiments of the present disclosure also provide a super wide-angle optical system implementable as an omni-directional optical system, for performing excellent aberration control through a lens configuration which achieves a bright lens as well as a wide angle, and allowing input of an image of a 4π steradian sphere through arrangement of two optical systems including field of views of 190° or more in a reverse direction to an optical axis direction, so that a whole sphere as well as a horizontal 360-degree image perpendicular to the optical axis may be captured.

According to various embodiments of the present disclosure, a super wide-angle optical system includes a first lens group including a negative refractive power, and a second lens group including a positive refractive power, in order from an object side, and a structure between the first lens group and the second lens group, for restricting a size of one of an aperture and a luminous flux.

The first lens group includes a plurality of meniscus lenses convex toward an object, and a meniscus lens concave toward the object side, next to the plurality of meniscus lenses, in order from the object side, and a lens closest to an image in the first lens group is a positive lens.

The second lens group includes a cemented lens of a lens having a positive refractive power and a lens including a negative refractive power bonded to each other, in order from the object side, and a lens closest to the image in the second lens group is a lens including a positive refractive power.

Further, a meniscus lens closest to the image among the meniscus lenses convex toward the object in the first lens group may includes a non-spherical surface.

Further, a positive lens closest to the image in the first lens group may have a non-spherical surface.

Further, a positive lens in the second lens group may includes a non-spherical surface.

Further, a field of view of the super wide-angle optical system may satisfy the following condition.

$$190 \leq Wfov \quad \text{[Conditional formula]}$$

Herein, the Wfov of the Conditional formula may represent a maximum field of view.

Further, a field of view, an image height, and a focal length of the super wide-angle optical system may satisfy the following condition.

$$\frac{y}{2\sin\frac{\theta}{2}} \geq f \geq \frac{y}{2\tan\frac{\theta}{2}} \quad \text{[Conditional formula]}$$

Herein, the θ of the Conditional formula may represent a half field of view, the y of the Conditional formula may represent an image height (a distance from a center of an image to an outermost periphery of the image), and the f of the Conditional formula may represent a focal length.

Advantageous Effects

The super wide-angle optical system according to various embodiments of the present disclosure has a group with a negative refractive power on an object side, and a group with a positive refractive power on an image side. Therefore, a wide angle may easily be obtained, luminous flux control and aberration control may be enabled, and the chief ray angle (CRA) of an imaging device may be improved.

Further, owing to the presence of a plurality of meniscus lenses convex toward an object, wide angle-caused distortion may be controlled.

Further, the super wide-angle optical system according to various embodiments of the present disclosure facilitates aberration control such as chromatic aberration control or spherical aberration control, enables aberration control and CRA control, and allows use of a small-diameter non-spherical surface, thereby reducing cost.

BEST MODE FOR CARRYING OUT THE INVENTION

Figure 1:
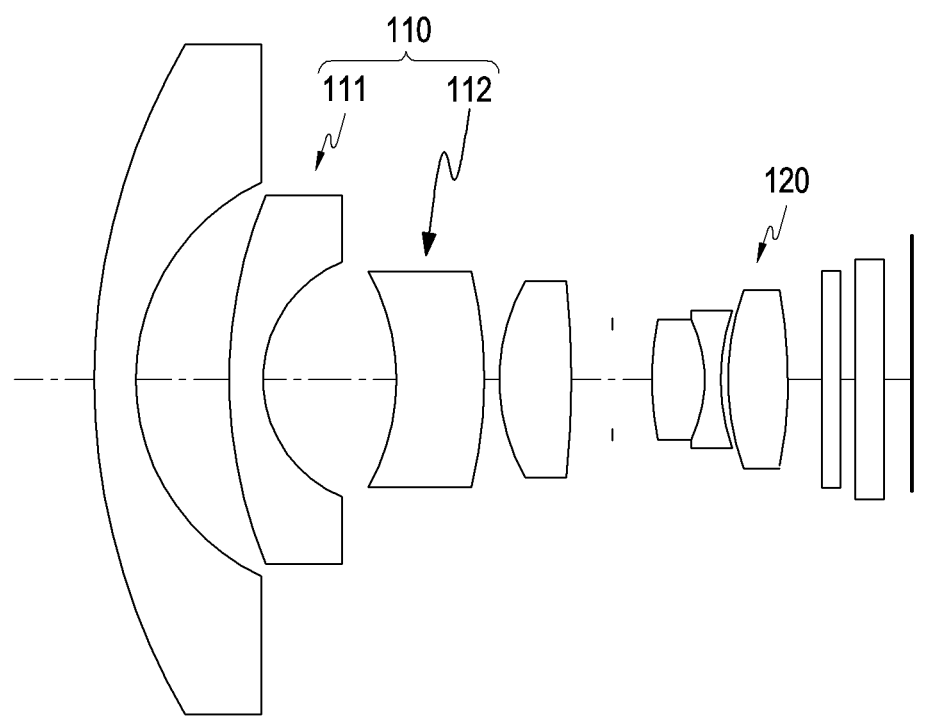
FIG. 1 is a view illustrating a lens layout in a super wide-angle optical system according to an embodiment among super wide-angle optical systems according to various embodiments of the present disclosure.

Various embodiments of the present disclosure are described with reference to the accompanying drawings. The embodiments are not intended to limit technologies described in the present disclosure to the particular embodiments, and it is to be understood that the present disclosure covers various modifications, equivalents, or alternatives to the embodiments. In relation to a description of the drawings, like reference numerals denote the same components.

In the present disclosure, the term "have", "may have", "include", or "may include" signifies the presence of a corresponding feature (for example, number, function, operation, or component such as a part), not excluding the presence of one or more other features.

In the present disclosure, the term "A or B", "at least one of A or/and B", or "one or more of A or/and B" may cover all possible combinations of enumerated items. For example, "A or B", "at least one of A and B", or "at least one of A or B" may represent all of the cases of (1) inclusion of at least one A, (2) inclusion of at least one B, and (3) inclusion of at least one A and at least one B.

The term as used in the present disclosure, "$1^{st}$", "$2^{nd}$", "first", or "second" may modify the names of various components irrespective of sequence and/or importance. These expressions are used to distinguish one component from another component, not limiting the components. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is "operatively or communicatively coupled with/to" or "connected to" another component (for example, a second component), it should be understood that the one component is connected to the other component directly or through any other component (for example, a third component). On the other hand, when it is said that a component (for example, a first component) is "directly connected to" or "directly coupled to" another component (for example, a second component), it may be understood that there is no other component (for example, a third component) between the components.

The term "configured to" as used herein may be replaced with, for example, the term "suitable for", "having the capacity to", "designed to", "adapted to", "made to", or "capable of" under circumstances. The term "configured to" may not necessarily mean "specifically designed to" in hardware. Instead, the term "a device configured to" may mean that the device may be "capable of" with another device or part. For example, "a processor configured to execute A, B, and C" may mean a dedicated processor (for example, an embedded processor) for performing the corresponding operations or a generic-purpose processor (for example, a central processing unit (CPU) or an application processor (AP)) for performing the operations by executing one or more software programs stored in a memory.

The terms as used in the present disclosure are provided to describe merely specific embodiments, not intended to limit the scope of other embodiments. It is to be understood that singular forms include plural referents unless the context clearly dictates otherwise. The terms and words including technical or scientific terms used herein may have the same meanings as generally understood by those skilled in the art. Among the terms used in the present disclosure, the terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may be at least one of, for example, a smartphone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, mobile medical equipment, a camera, or an wearable device. According to various embodiments, the wearable device may be at least one of an accessory type (for example, a watch, a ring, a bracelet, a necklace, glasses, contact lenses, or a head-mounted device (HMD)), a fabric or clothes type (for example, electronic clothes), a body-attached type (for example, a skin pad or a tattoo), or an implantable type (for example, an implantable circuit).

According to some embodiments, an electronic device may be a home appliance. The home appliance may be at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic picture frame.

According to other embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS) receiver, an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may be at least one of furniture, part of a building/structure, an electronic board, an electronic signature receiving device, a projector, and various measuring devices (for example, water, electricity, gas or electromagnetic wave measuring devices). According to various embodiments, an electronic device may be a combination of two or more of the foregoing devices. According to some embodiments, an electronic device may be a flexible electronic device. According to an embodiment of the present disclosure, an electronic device is not limited to the foregoing devices, and may cover a new electronic device which will emerge along with technology development.

In relation to a super wide-angle optical system according to the present disclosure, the effects and technical configuration for achieving the above-descried objects will be clearly understood from the following detailed description given with reference to the attached drawings illustrating preferred embodiments of the present disclosure.

While the thicknesses, sizes, and shapes of lenses are shown as more or less exaggerated in a lens configuration diagram for each embodiment, for the detailed description of the present disclosure, particularly the shapes of the spherical or non-spherical surfaces illustrated in the lens configuration diagrams are merely exemplary, and thus should not be construed as limiting.

According to various embodiments of the present disclosure, a super wide-angle optical system 100 may include a first lens group 110 having a negative (or 'minus (−)') refractive power and a second lens group 120 having a positive (or 'plus (+)') refractive power, arranged in order from an object side. A structure for restricting the size of an aperture or luminous flux may further be interposed between the first lens group 110 and the second lens group 120.

According to various embodiments of the present disclosure, the first lens group 110 may include a plurality of meniscus lenses 111 convex toward an object, accompanied by a meniscus lens 112 concave toward the object, in order from the object side. Further, a lens closest to an image in the first lens group 110 may be a positive lens.

According to various embodiments of the present disclosure, the second lens group 120 may include a cemented lens with a lens with a positive refractive power and a lens with a negative refractive power bonded to each other, arranged in order from the object side, and a lens closest to the image in the second lens group 120 may be a lens with a positive refractive power. In the first lens group 110, a lens closest to the image among the meniscus lenses convex toward the object may have a non-spherical surface. Further, the positive lens closest to the image in the first lens group 110 may be configured to have a non-spherical surface. Further, a positive lens of the second lens group may have a non-spherical surface. In various embodiments of the present disclosure, a super wide-angle lens may have a field of view equal to or larger than 190° to acquire an omni-directional image. Further, to limit the magnification of a peripheral object with respect to a center object, a focal length should fall within the range expressed as the following formula.

$$\frac{y}{2\sin\frac{\theta}{2}} \geq f \geq \frac{y}{2\tan\frac{\theta}{2}}$$

Herein, the f represents the focal length, the θ represents a half field of view, and the y is an image height (the distance from the center of an image to the outermost periphery of the image).

Hereinbelow, an operation of the super wide-angle optical system having the above-described configuration according to various embodiments of the present disclosure will be described.

As described before, the super wide-angle optical system 100 may include the first lens group 110 having a negative refractive power, and the second lens group 120 having a positive refractive power, arranged in order from the object side. The first lens group 110 may include the plurality of meniscus lenses 111 convex toward the object, accompanied by the meniscus lens 112 concave toward the object, in order from the object side. The lens closest to the image in the first lens group may be a positive lens. The second lens group 120 may include the cemented lens with a lens with a positive refractive power and a lens with a negative refractive power bonded to each other, in order from the object side. The lens closest to the image in the second lens group 120 may be a lens with a positive refractive power.

For example, it is possible to achieve a wide angle by making the first lens group 110 have a negative refractive power, for a super wide field of view, and an image may be formed on an imaging device by making the second lens group 120 have a positive refractive power. An F number (fno) and an ambient light intensity may be controlled through the structure for controlling a luminous flux, interposed between the first lens group 110 and the second lens group 120. As a group having a negative refractive power is provided on the object side and a group having a positive refractive power is provided on the image side, with respect to the stop, a wide angle may be readily achieved, and luminous flux control and aberration control are possible. Further, in order to control a distortion caused by a wide angle, the plurality of meniscus lenses 111 convex toward the object may be provided. However, it is not easy to achieve a short focal length and aberration control just with the meniscus lenses convex toward the object. To solve this problem, a meniscus lens concave toward the object may be included behind the plurality of meniscus lenses convex toward the object. If the first lens group 110 includes only negative lenses to have a strong negative refractive power, it may be difficult to obtain a short focal length, and aberration control may be limited. Therefore, to solve the problem, a lens having a positive refractive power is provided at a position closest to the image in the first lens group 110. As the cemented lens with the lens having a positive refractive power and the lens having a negative refractive power bonded to each other is included in the second lens group 120 having a positive refractive power, chroma aberration control is facilitated. Further, since a positive lens is disposed at a position closest to the image in the second lens group 120, aberration control and chief ray angle (CRA) control are enabled.

Further, the lens closest to the image among the meniscus lenses convex toward the object side in the first lens group 110 may be configured to have a non-spherical surface. Although aberration control caused by a wide angle may be performed by including the plurality of meniscus lenses 111 convex toward the object in the first lens group 110, a non-spherical surface needs to be used in order to effectively control comma and astigmatism. However, since cost increases according to the size of the non-spherical surface, a small-diameter non-spherical surface may be used by disposing the non-spherical surface on the lens closest to the image among the meniscus lenses convex toward the object side in the first lens group 110, thereby reducing cost.

Further, the positive lens closest to the image in the first lens group 110 may be configured to have a non-spherical surface. As a lens having a positive refractive power is disposed as the lens closest to the image in the first lens group 110, the negative refractive power of the first lens group 110 may be maximized. In addition, if the positive lens closest to the image is configured to have a non-spherical surface in the first lens group 11, aberration control such as spherical control may be performed.

Further, the positive lens of the second lens group 120 may include a non-spherical surface. If the non-spherical surface is used for the positive lens in the second lens group 120, aberrations such as comma, astigmatism, and field curvature may be controlled. Further, the CRA of the imaging device may become better.

A super wide-angle lens may be configured by means of the above-described configuration of the present disclosure, thereby acquiring a 360-degree omni-directional image. If a field of view equal to or larger than 190° is acquired, an image in a direction perpendicular to an optical axis may be achieved. The acquisition of an image in a direction perpendicular to the optical axis enables input of a 360-degree image in the direction perpendicular to the optical axis. Further, if the focal lengths falls within the range calculated by the above formula, the magnification of a peripheral object with respect to a center object may be limited, thus securing the size of an image perpendicular to the optical axis. If two optical systems as described above are arranged with their backs facing each other, an image including a field of view of a 4π steradian sphere may be input. Therefore, an omni-directional optical system capable of capturing a whole sphere as well as a horizontal 360-degree image perpendicular to an optical axis may be configured.

Meanwhile, as mentioned before, the super wide-angle optical system 100 of the present disclosure achieves a field of view and a focal length, or a field of view and an image height by the following conditional formulas, and each conditional formula and its effect will be described below.

$$190 \leq \text{Wfov} \qquad \text{[Conditional formula]}$$

Herein, the Wfov of the Conditional formula 1 may represent a maximum field of view.

Conditional formula 1 expresses the field of view of the super wide-angle optical system 100. To acquire an omni-directional image, the maximum field of view should be 190° or more. Only when an image perpendicular to an optical axis is acquired, a 360-degree image perpendicular to the optical axis may be acquired. If two super wide-angle lenses are provided, an image of a whole 4π (steradian sphere may be input. For this purpose, the field of view of a single super wide-angle lens should be at least 190°.

$$\frac{y}{2\sin\frac{\theta}{2}} \geq f \geq \frac{y}{2\tan\frac{\theta}{2}} \qquad \text{[Conditional formula 2]}$$

Herein, the θ of the Conditional formula 2 may represent a half field of view, they of the Conditional formula 2 may represent an image height (the distance from the center of an image to the outermost periphery of the image), and the f of the Conditional formula 2 may represent a focal length.

The above Conditional formula 2 describes a field of view, an image height, and a focal length of the super wide-angle optical system 100. The spatial frequency magnifications of a center object and a peripheral object are important in configuring the super wide-angle optical system 100. An expression of the special frequency magnifications is a mapping function. Among four mapping functions, the super wide-angle optical system 100 which acquires an omni-directional image preferably has a mapping function for a stereo graphic, equidistant, or equisolid angle, which is favorable to an omni-directional image due to less compression of a peripheral image. Therefore, if Conditional formula 2 is satisfied, up to the mapping function for a stereo graphic, equidistant, or equisolid angle is satisfied. The resulting minimization of a compression ratio of a peripheral image to a center image may minimize the degradation of the image quality of the peripheral image.

A more detailed description will be given of the super wide-angle optical system 100 according to various embodiments of the present disclosure in the context of specific values.

In the following first, second, and third embodiments, as described before, the super wide-angle optical system 100 may include the first lens group 110 having a negative refractive power and the second lens group 120 having a positive refractive power, arranged in order from the object side. The structure for restricting the size of an aperture or luminous flux may be interposed between the first lens group 110 and the second lens group 120. The first lens group 110 may include the plurality of meniscus lenses 111 convex toward the object, accompanied by the meniscus lens 112 concave toward the object, in order from the object side. The lens closest to the image in the first lens group 110 may be a positive lens. The second lens group 120 may include the cemented lens with lenses having positive and negative refractive powers bonded to each other, arranged in order from the object side, and the lens closest to the image in the second lens group 120 may be a lens having a positive refractive power.

Meanwhile, a non-spherical surface used in each embodiment as described below may be obtained by known [Equation 1], K represents a conic constant, and 'E and the following number' used in non-spherical coefficients A, B, C, and D represents a power of 10. For example, E+02 may represent $10^2$, and E-02 may represent $10^{-2}$.

$$x = \frac{c'y^2}{1 + \sqrt{1 - (K+1)c'^2 y^2}} + Ay^4 + By^6 + Cy^8 + Dy^{10}$$

[Equation 1]

Herein,

The x of the Equation 1: the distance from the apex of a lens in a coaxial direction.

They of the Equation 1: the distance in a direction perpendicular to an optical axis.

The c' of the Equation 1: the reciprocal (=1/R) of a radius of curvature at the apex of the lens.

The K, A, B, C and D of Equation 1: non-spherical coefficients.

Embodiment 1

Figure 2:
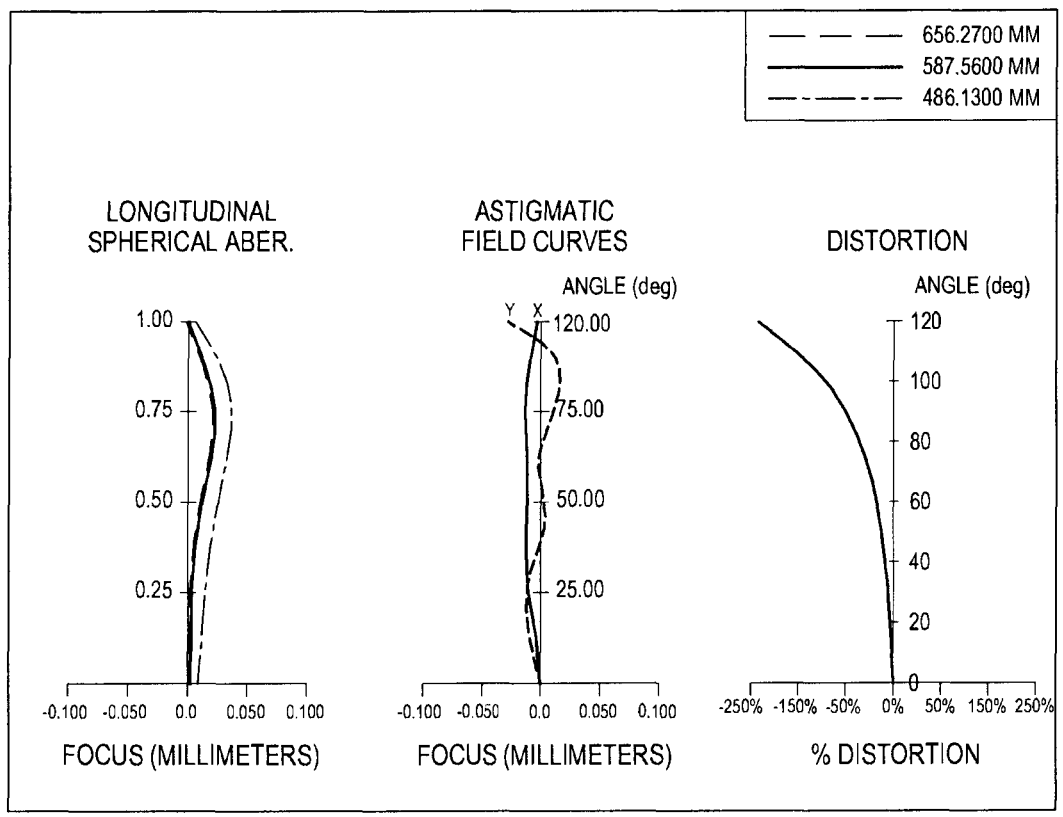
FIG. 2 is an aberration diagram of the super wide-angle optical system illustrated in FIG. 1 among the super wide-angle optical systems according to various embodiments of the present disclosure.

The following [Table 1] may illustrate an example of values according to one of various embodiments of the present disclosure. Further, FIG. 1 is a diagram illustrating a lens layout in the super wide-angle optical system according to one of various embodiments of the present disclosure, and FIG. 2 is an aberration diagram for the super wide-angle optical system illustrated in FIG. 1.

In Embodiment 1, f may be 1.19 mm, Fno may be 1.97, and a field of view may be 200° in the overall optical system.

TABLE 1

| Surface | Radius of curvature | Thickness | Refractive index (nd) | Abbe number |
|---|---|---|---|---|
| 1 | 11.716 | 0.80 | 1.835 | 42.72 |
| 2 | 3.890 | 1.66 | | |
| *3 | 50.000 | 0.60 | 1.740 | 59.10 |
| *4 | 2.700 | 2.39 | | |
| 5 | -4.100 | 1.60 | 1.804 | 46.50 |
| 6 | -7.476 | 0.29 | | |
| *7 | 3.721 | 1.27 | 1.805 | 40.90 |
| *8 | -9.715 | 0.76 | | |
| STOP | infinity | 0.70 | | |
| 10 | 4.631 | 0.95 | 1.773 | 49.62 |
| 11 | -2.600 | 0.30 | 1.923 | 20.88 |
| 12 | 3.875 | 0.15 | | |
| *13 | 3.919 | 1.08 | 1.740 | 59.10 |
| *14 | -5.307 | 0.62 | | |
| 15 | infinity | 0.30 | 1.517 | 64.20 |
| 16 | infinity | 0.30 | | |
| 17 | infinity | 0.50 | 1.517 | 64.20 |
| 18 | infinity | 0.53 | | |

In [Table 1], symbol * before a surface number may indicate non-spherical surface.

Further, the values of non-spherical coefficients calculated by [Equation 1] are listed in the following [Table 2] in Embodiment 1.

TABLE 2

| Surface | K | A | B | C | D |
|---|---|---|---|---|---|
| 3 | 0.000000 | 1.737195E-02 | -1.990643E-03 | 9.325857E-05 | -1.579806E-06 |
| 4 | -1.000000 | 2.519815E-02 | 5.374012E-03 | -1.358760E-03 | 6.767660E-05 |
| 7 | 0.000000 | 5.240657E-04 | -7.662172E-05 | -1.920980E-05 | 0.000000E+00 |
| 8 | 0.000000 | 6.900172E-03 | -9.121338E-04 | 9.508714E-05 | 0.000000E+00 |
| 13 | 0.000000 | -1.143270E-02 | 3.426939E-03 | -3.526360E-04 | 0.000000E+00 |
| 14 | 0.000000 | 6.725823E-03 | 1.116064E-03 | 1.937055E-04 | 0.000000E+00 |

Embodiment 2

The following [Table 3] may illustrate an example of values according to one other embodiment (hereinafter, referred to as 'Embodiment 2') than the foregoing embodiment among various embodiments of the present disclosure.

Figure 3:
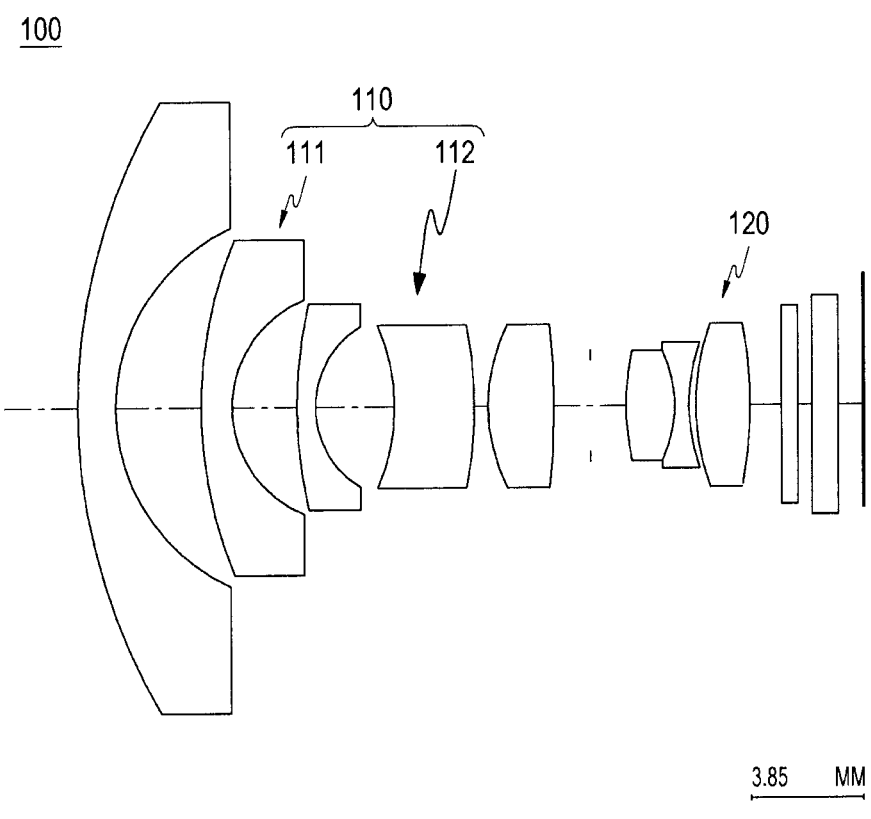
FIG. 3 is a view illustrating a lens layout in a super wide-angle optical system according to another embodiment among the super wide-angle optical systems according to various embodiments of the present disclosure.
Figure 4:
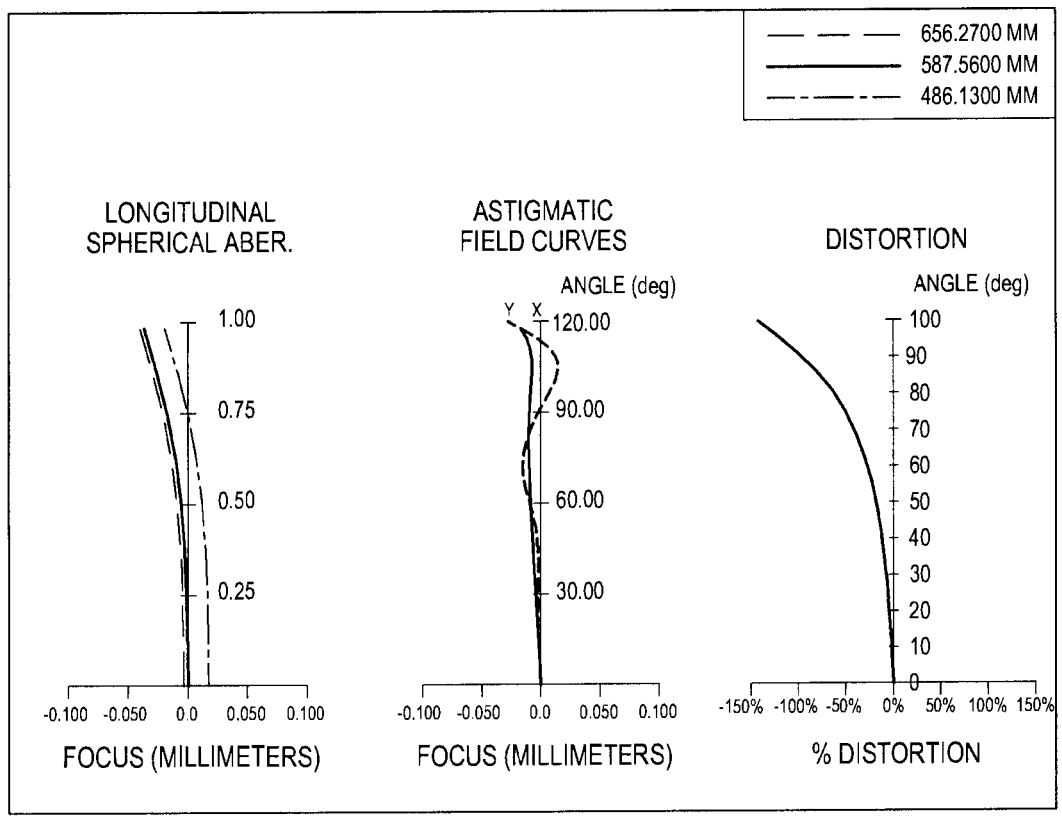
FIG. 4 is an aberration diagram of the super wide-angle optical system illustrated in FIG. 3 among the super wide-angle optical systems according to various embodiments of the present disclosure.

Further, FIG. 3 is a diagram illustrating a lens layout in the super wide-angle optical system according to one of various embodiments of the present disclosure, and FIG. 4 is an aberration diagram for the super wide-angle optical system illustrated in FIG. 3.

In Embodiment 2, f may be 0.95 mm, Fno may be 2.18, and a field of view may be 240° in the overall optical system.

TABLE 3

| Surface | Radius of curvature | Thickness | Refractive index (nd) | Abbe number |
|---|---|---|---|---|
| 1 | 16.715 | 2.00 | 1.835 | 42.72 |
| 2 | 7.155 | 2.38 | | |
| 3 | 11.053 | 0.80 | 1.773 | 49.62 |
| 4 | 3.886 | 2.05 | | |
| *5 | 35.342 | 0.60 | 1.740 | 59.10 |
| *6 | 2.700 | 1.98 | | |
| 7 | −4.100 | 1.63 | 1.697 | 55.46 |
| 8 | −45.000 | 0.33 | | |
| *9 | 3.949 | 2.25 | 1.805 | 40.90 |
| *10 | −9.538 | 0.87 | | |
| STOP | infinity | 0.80 | | |
| 12 | 2.600 | 2.02 | 1.497 | 81.61 |

TABLE 3-continued

| Surface | Radius of curvature | Thickness | Refractive index (nd) | Abbe number |
|---|---|---|---|---|
| 13 | −2.600 | 0.30 | 1.923 | 20.88 |
| 14 | 5.023 | 0.16 | | |
| *15 | 4.213 | 1.46 | 1.740 | 59.10 |
| *16 | −2.860 | 0.71 | | |
| 17 | infinity | 0.30 | 1.517 | 64.20 |
| 18 | infinity | 0.30 | | |
| 19 | infinity | 0.50 | 1.517 | 64.20 |
| 20 | infinity | 0.53 | | |

In [Table 3], symbol * before a surface number may indicate non-spherical surface.

Further, the values of non-spherical coefficients calculated by [Equation 1] are listed in the following [Table 4] in Embodiment 2.

TABLE 4

| Surface | K | A | B | C | D |
|---|---|---|---|---|---|
| 5 | 0.000000 | 4.892892E−03 | −2.158396E−04 | −9.654502E−06 | 7.019990E−07 |
| 6 | −1.000000 | 4.137913E−03 | 1.999401E−03 | −1.680804E−04 | 1.460570E−05 |
| 9 | 0.000000 | −1.675004E−03 | 4.028469E−04 | −2.526123E−06 | 0.000000E+00 |
| 10 | 0.000000 | 3.439272E−03 | 5.624994E−04 | 1.250070E−06 | 0.000000E+00 |
| 15 | 0.000000 | −6.350440E−03 | 1.350301E−03 | 2.333793E−05 | 0.000000E+00 |
| 16 | 0.000000 | 2.009844E−02 | −3.926191E−04 | 5.144062E−04 | 0.000000E+00 |

Embodiment 3

The following [Table 5] may illustrate an example of values according to one other embodiment (hereinafter, referred to as 'Embodiment 3') than the foregoing embodiments among various embodiments of the present disclosure.

Figure 5:
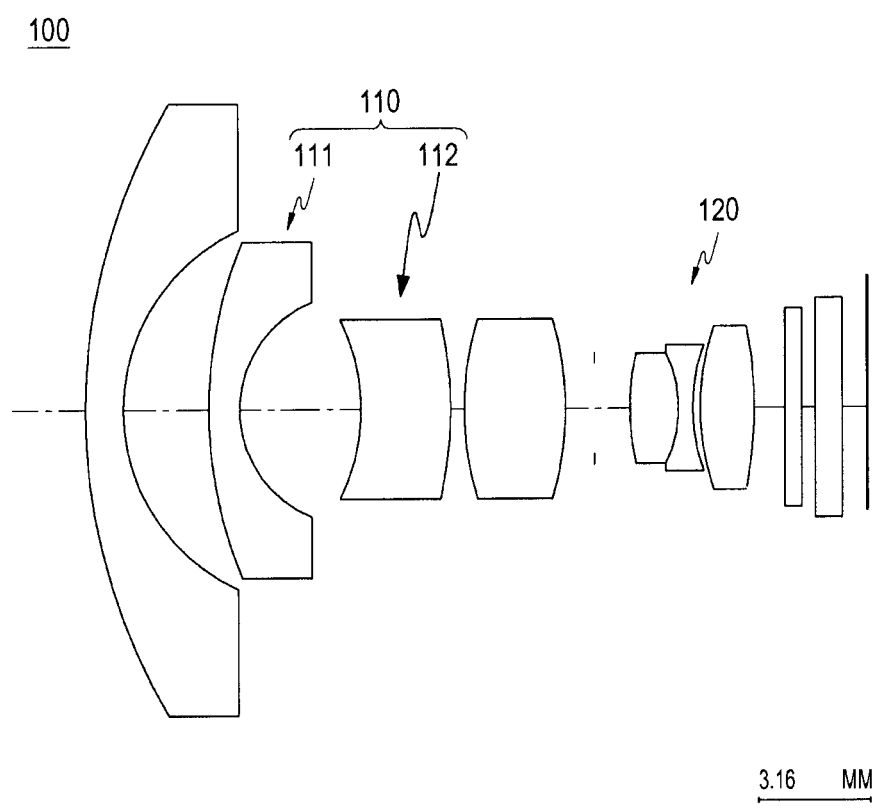
FIG. 5 is a view illustrating a lens layout in a super wide-angle optical system according to another embodiment among the super wide-angle optical systems according to various embodiments of the present disclosure.
Figure 6:
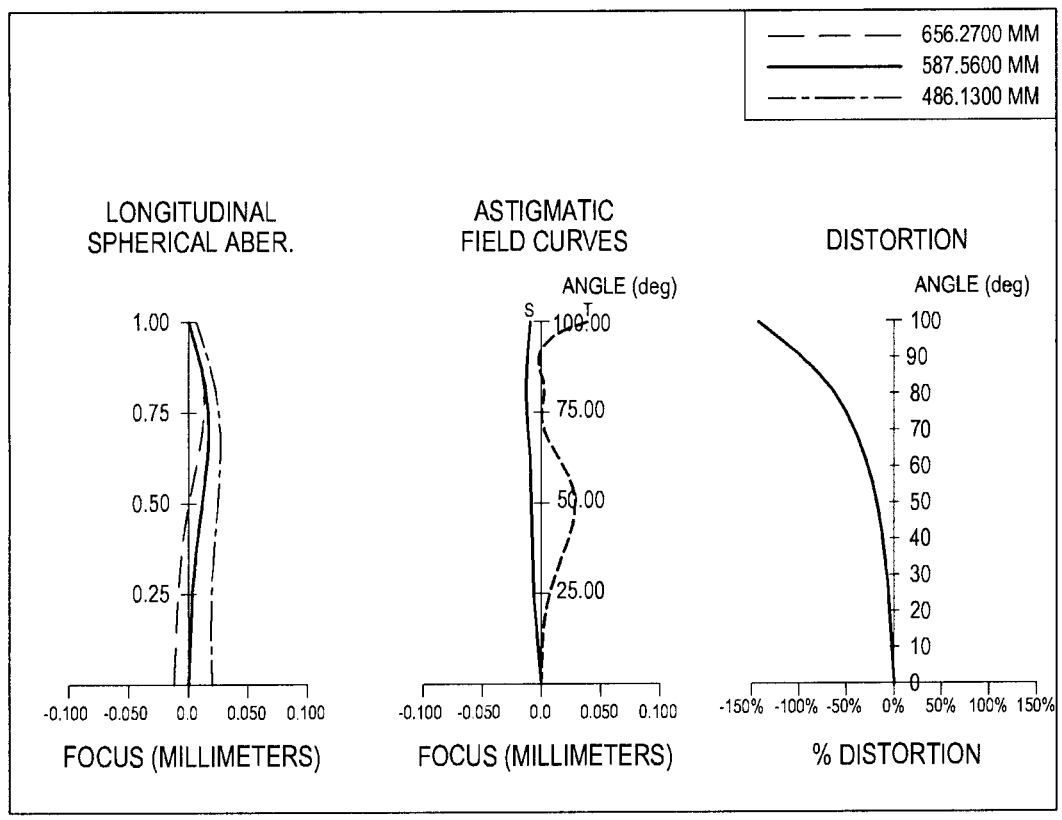
FIG. 6 is an aberration diagram of the super wide-angle optical system illustrated in FIG. 5 among the super wide-angle optical systems according to various embodiments of the present disclosure.

Further, FIG. 5 is a diagram illustrating a lens layout in the super wide-angle optical system 100 according to one of various embodiments of the present disclosure, and FIG. 6 is an aberration diagram for the super wide-angle optical system illustrated in FIG. 5.

In Embodiment 3, f may be 1.90 mm, Fno may be 2.17, and a field of view may be 200° in the overall optical system.

TABLE 5

| Surface | Radius of curvature | Thickness | Refractive index (nd) | Abbe number (vd) |
|---|---|---|---|---|
| 1 | 17.815 | 1.00 | 1.835 | 42.72 |
| 2 | 6.446 | 2.76 | | |
| *3 | 83.000 | 0.75 | 1.740 | 49.10 |
| *4 | 4.500 | 3.68 | | |
| *5 | −6.802 | 3.28 | 1.818 | 24.20 |
| *6 | −8.401 | 0.25 | | |
| *7 | 11.188 | 3.23 | 1.805 | 40.90 |
| *8 | −8.050 | 1.24 | | |
| STOP | infinity | 1.00 | | |
| 10 | 6.574 | 1.06 | 1.773 | 49.62 |
| 11 | −4.553 | 0.40 | 1.923 | 20.88 |
| 12 | 5.492 | 0.36 | | |
| *13 | 12.391 | 1.17 | 1.740 | 49.10 |
| *14 | −6.442 | 1.89 | | |
| 15 | infinity | 0.30 | 1.517 | 64.20 |
| 16 | infinity | 0.30 | | |
| 17 | infinity | 0.50 | 1.517 | 64.20 |
| 18 | infinity | 0.53 | | |

In [Table 3], symbol * before a surface number may indicate non-spherical surface.

Further, the values of non-spherical coefficients calculated by [Equation 1] are listed in the following [Table 6] in Embodiment 2.

TABLE 6

| Surface | K | A | B | C | D |
|---|---|---|---|---|---|
| 3 | 0.000000 | 2.700544E−03 | −1.023635E−04 | 1.898112E−06 | −1.211579E−08 |
| 4 | −1.000000 | 3.807090E−03 | 1.987742E−04 | −1.463066E−05 | 1.758136E−07 |
| 5 | 0.000000 | −2.691462E−03 | 1.159825E−04 | 1.251088E−06 | 0.000000E+00 |
| 6 | 0.000000 | 9.469219E−04 | 1.127789E−04 | 3.405438E−07 | 0.000000E+00 |
| 7 | 0.000000 | 7.819787E−04 | 7.981969E−05 | −5.219877E−06 | 0.000000E+00 |
| 8 | 0.000000 | 3.694638E−04 | 2.788199E−05 | −2.070721E−06 | 0.000000E+00 |
| 13 | 0.000000 | −1.881749E−03 | 9.691677E−04 | −2.833680E−05 | 0.000000E+00 |
| 14 | 0.000000 | 1.230888E−03 | 3.798748E−04 | 7.461032E−05 | 0.000000E+00 |

Meanwhile, the values of the conditional formulas in Embodiment 1, Embodiment 2, and Embodiment 3 are listed in [Table 7] below.

TABLE 7

| Conditional formula | Embodiment | | |
|---|---|---|---|
| | ex1 | ex2 | ex3 |
| $190 \leq \text{wfov}$ | 200° | 240° | 200° |
| $\dfrac{y}{2\sin\dfrac{\theta}{2}}$ | 1.52 | 1.35 | 2.53 |
| $\dfrac{y}{2\tan\dfrac{\theta}{2}}$ | 0.98 | 0.67 | 1.63 |
| f | 1.19 | 0.95 | 1.90 |

With reference to the attached drawings, an electronic device according to various embodiments will be described below. In the present disclosure, the term user may refer to a person or device (for example, artificial intelligence electronic device) that uses an electronic device.

Figure 7:
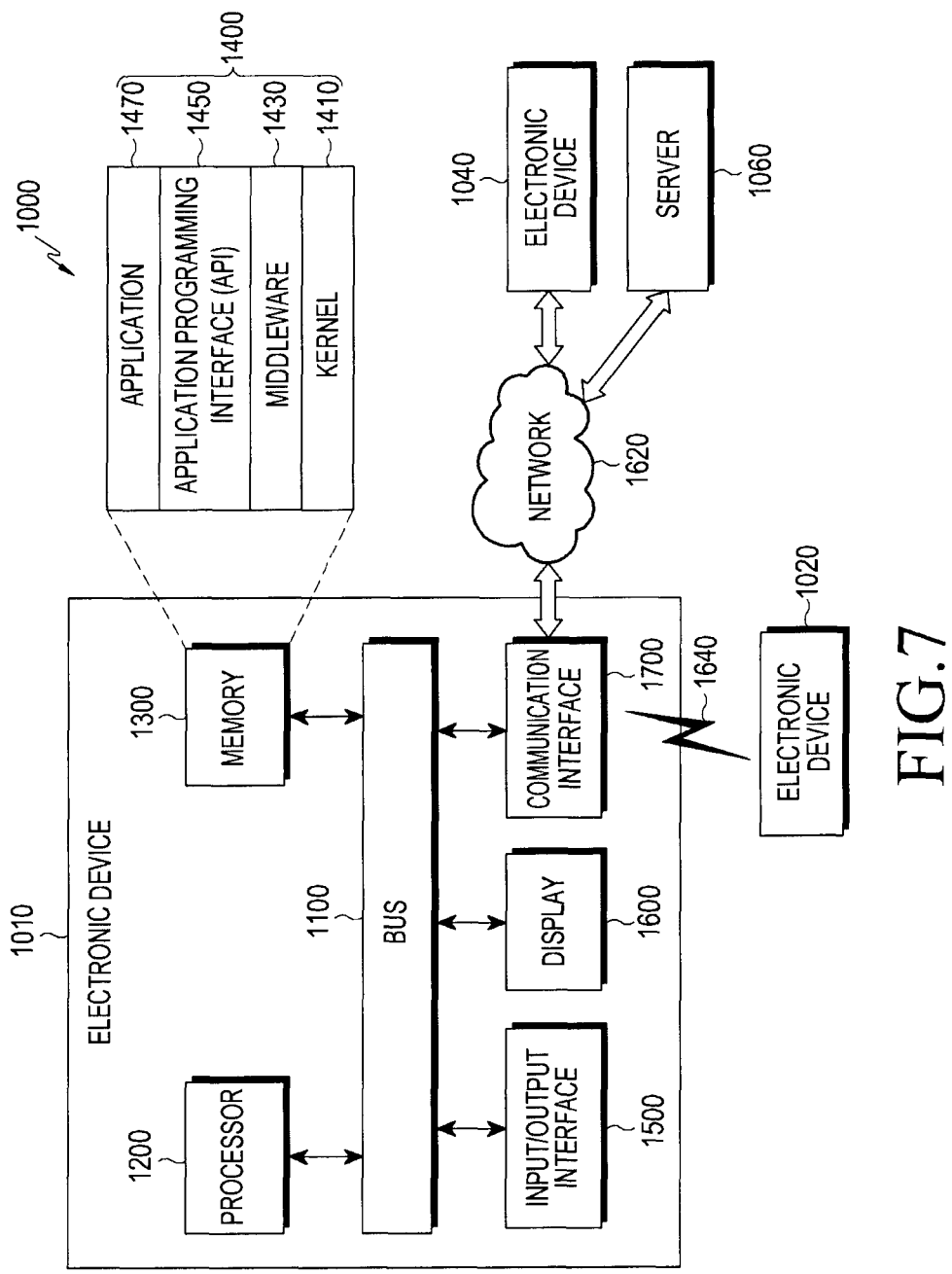
FIG. 7 is a block diagram of an electronic device in a network environment according to various embodiments.

Referring to FIG. 7, an electronic device 1010 in a network environment 1000 according to various embodiments is described. The electronic device 1010 may include a bus 110, a processor 1200, a memory 13000, an input/output (I/O) interface 1500, a display 1600, and a communication interface 1700. In some embodiments, at least one of the components may be omitted in the electronic device 1010 or a component may be added to the electronic device 1010.

The bus 110 may include, for example, a circuit that interconnects, the components 1200, 1300, 1500, 1600, and 1700 and allows communication (for example, control messages and/or data) between the components.

The processor 1200 may include one or more of a CPU, an AP, or a communication processor (CP). The processor 1200 may, for example, execute computation or data processing related to control and/or communication of at least one other component of the electronic device 1010. The processor 1200 may be called a controller. Or the processor 1200 may include the controller as its part or may form the controller.

The memory 13000 may include a volatile memory and/or a non-volatile memory. The memory 13000 may, for example, store instructions or data related to at least one other component of the electronic device 1010. According to an embodiment, the memory 13000 may store software and/or programs 1400. The programs 1400 may include, for example, a kernel 1410, middleware 1430, an application programming interface (API) 1450, and/or application programs (or applications) 1470. At least a part of the kernel 1410, the middleware 1430, or the API 1450 may be called an operating system (OS).

The kernel 1410 may control or manage system resources (for example, the bus 110, the processor 1200, or the memory 1300) that are used in executing operations or functions implemented in other programs (for example, the middleware 1430, the API 1450, or the application programs 1470). Also, the kernel 1410 may provide an interface for allowing the middleware 1430, the API 1450, or the application programs 1470 to access individual components of the electronic device 1010 and control or manage system resources.

The middleware 1430 may serve as a medium through which the kernel 1410 may communicate with, for example, the API 1450 or the application programs 1470 to transmit and receive data.

Further, the middleware 1430 may process one or more task requests received from the application programs 1470 according to their priority levels. For example, the middleware 1430 may assign priority levels for using system resources (the bus 110, the processor 1200, or the memory 1300) of the electronic device 1010 to at least one of the application programs 1470, and process the one or more task requests according to the priority levels. For example, the middleware 1430 may perform scheduling or load balancing for the one or more task requests by processing the one or more task requests according to the priority level assigned to the at least one application program 1470.

The API 1450 is an interface for the applications 1470 to control functions that the kernel 1410 or the middleware 1430 provides. For example, the API 1450 may include at least one interface or function (for example, a command) for file control, window control, video processing, or text control.

The I/O interface 1500 may, for example, provide a command or data received from a user or an external device to the other component(s) of the electronic device 1010, or output a command or data received from the other component(s) of the electronic device 1010 to the user or the external device.

The display 1600 may include, for example, a liquid crystal display (LCD), a light emitting diode (LED) display, an organic LED (OLED) display, a microelectromechanical systems (MEMS) display, or an electronic paper display. The display 1600 may display, for example, various types of content (for example, text, an image, a video, an icon, and/or a symbol) to the user. The display 1600 may include a touch screen and receive, for example, a touch input, a gesture input, a proximity input, or a hovering input through an electronic pen or a user's body part.

The communication interface 1700 may establish communication, for example, between the electronic device 1010 and an external device (for example, a first external electronic device 1020, a second external electronic device 1040, or a server 1060). For example, the communication interface 1700 may be connected to a network 1620 by wireless communication or wired communication, and communicate with the external device (for example, the second external electronic device 1040 or the server 1060) over the network 1620. The communication interface 1700 may include a CP, and the CP may be configured as one of a plurality of modules in the communication interface 1700. According to an embodiment, the CP may be included in the processor 1700.

The wireless communication may include cellular communication conforming to, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM). Further, the wireless communication may include, for example, short-range communication 1640. The short-range communication 1640 may include at least one of wireless fidelity (WiFi), Bluetooth, near field communication (NFC), or global navigation satellite system (GNSS). GNSS may include at least one of, for example, global positioning system (GPS), global navigation satellite system (Glonass), Beidou navigation satellite system (hereinafter, referred to as 'Beidou'), or Galileo, the European global satellite-based navigation system. In the present disclosure, the terms "GPS" and "GNSS" are interchangeably used with each other. The wired communication may be conducted in conformance to, for example, at least one of universal serial bus (USB), high definition multimedia interface (HDMI), recommended standard 23200 (RS-23200), or plain old telephone service (POTS). The network 1620 may be a telecommunication network, for example, at least one of a computer network (for example, local area network (LAN) or wide area network (WAN)), the Internet, or a telephone network.

Each of the first and second external electronic devices 1020 and 1040 may be of the same type as or a different type from the electronic device 1010. According to an embodiment, the server 1060 may include a group of one or more servers. According to various embodiments, all or a part of operations performed in the electronic device 1010 may be performed in one or more other electronic devices (for example, the electronic devices 1020 and 1040) or the server 1060. According to an embodiment, if the electronic device 1010 is to perform a function or a service automatically or upon request, the electronic device 1010 may request at least a part of functions related to the function or the service to another device (for example, the electronic device 1020 or 1040 or the server 1060), instead of performing the function or the service autonomously, or additionally. The other electronic device (for example, the electronic device 1020 or 1040 or the server 1060) may execute the requested function or an additional function and provide a result of the function execution to the electronic device 1010. The electronic device 1010 may provide the requested function or service based on the received result or by additionally processing the received result. For this purpose, for example, cloud computing, distributed computing, or client-server computing may be used.

Figure 8:
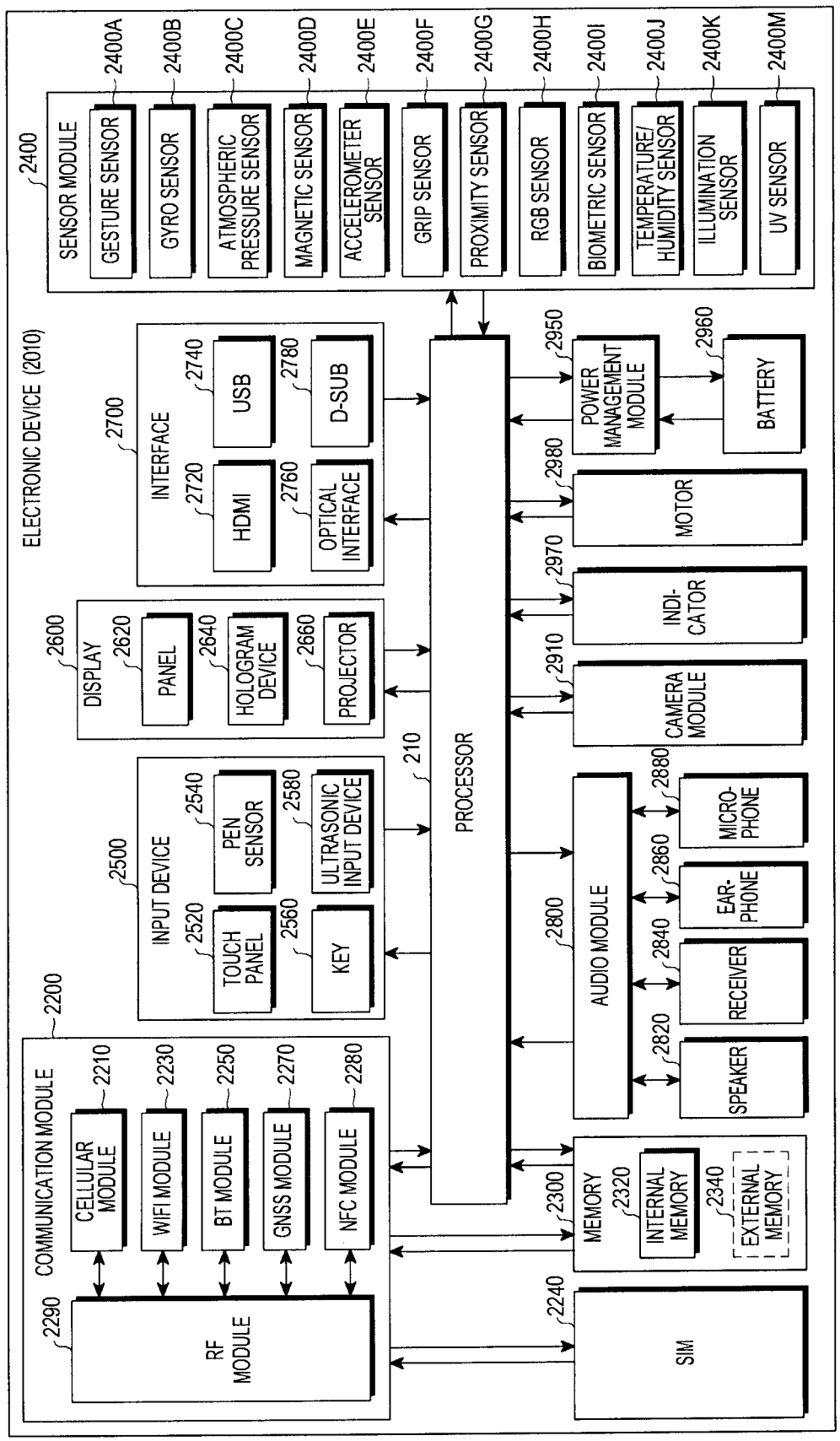
FIG. 8 is a block diagram of an electronic device according to various embodiments.

FIG. 8 is a block diagram of an electronic device according to various embodiments of the present disclosure. An electronic device 2010 may include, for example, the whole or part of the electronic device 1010 illustrated in FIG. 1. The electronic device 2010 may include at least one processor (for example, AP) 2100, a communication module 2200, a memory 2300, a sensor module 2400, an input device 2500, and a display 2600. The electronic device 2010 may further include at least one of a subscriber identification module (SIM) 2240, an interface 2700, an audio module 2800, a camera module 2910, a power management module 2950, a battery 2960, an indicator 2970, and a motor 2980.

The processor 2100 may, for example, control a plurality of hardware or software components that are connected to the processor 2100 by executing an OS or an application program, and may perform processing or computation of various types of data. The processor 2100 may be implemented, for example, as a system on chip (SoC). According to an embodiment, the processor 2100 may further include a graphic processing unit (GPU) and/or an image signal processor. The processor 2100 may include at least a part (for example, a cellular module 22100) of the components illustrated in FIG. 2. The processor 2100 may load a command or data received from at least one of other components (for example, a non-volatile memory), process the loaded command or data, and store various data in the non-volatile memory.

The communication module 2200 may have the same configuration as or a similar configuration to that of the communication interface 1700 illustrated in FIG. 1. The communication module 2200 may include, for example, the cellular module 22100, a WiFi module 22300, a Bluetooth module 22500, a GNSS module 22700 (for example, a GPS module, a Glonass module, Beidou module, or a Galileo module), an NFC module 22800, and a radio frequency (RF) module 2290.

The cellular module 22100 may provide services such as voice call, video call, text service, or the Internet service, for example, through a communication network. According to an embodiment, the cellular module 22100 may identify and authenticate the electronic device 2010 within a communication network, using the SIM (for example, a SIM card) 22400. According to an embodiment, the cellular module 22100 may perform at least a part of the functionalities of the processor 2100. According to an embodiment, the cellular module 22100 may include a CP.

Each of the WiFi module 22300, the Bluetooth module 22500, the GNSS module 22700, and the NFC module 22800 may include, for example, a processor for processing data transmitted and received through the module. According to an embodiment, at least a part (for example, two or more) of the cellular module 22100, the WiFi module 22300, the Bluetooth module 22500, the GNSS module 22700, or the NFC module 22800 may be included in a single integrated chip (IC) or IC package.

The RF module 2290 may transmit and receive, for example, communication signals (for example, RF signals). The RF module 2290 may include, for example, a transceiver, a power amplifier module (PAM), a frequency filter, a low noise amplifier (LNA), an antenna, or the like. According to another embodiment, at least one of the cellular module 22100, the WiFi module 22300, the Bluetooth module 22500, the GNSS module 22700, or the NFC module 22800 may transmit and receive RF signals via a separate RF module.

The SIM 22400 may include, for example, a card including the SIM and/or an embedded SIM. The SIM 22400 may include a unique identifier (for example, integrated circuit card identifier (ICCID)) or subscriber information (for example, international mobile subscriber identity (IMSI)).

The memory 2300 (for example, the memory 1300) may include, for example, an internal memory 23200 and/or an external memory 2340. The internal memory 23200 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), a hard drive, or a solid state drive (SSD)).

The external memory 2340 may further include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 2340 may be operatively or physically coupled to the electronic device 2010 via various interfaces.

The sensor module 2400 may, for example, measure physical quantities or detect operational states of the electronic device 2010, and convert the measured or detected information into electric signals. The sensor module 2400 may include at least one of, for example, a gesture sensor 2400A, a gyro sensor 2400B, an atmospheric pressure sensor 2400C, a magnetic sensor 2400D, an accelerometer sensor 2400E, a grip sensor 2400F, a proximity sensor 2400G, a color sensor (for example, a red, green, blue (RGB) sensor) 2400H, a biometric sensor 24001, a temperature/humidity sensor 2400J, an illumination sensor 2400K, or an ultra violet (UV) sensor 2400M. Additionally or alternatively, the sensor module 2400 may include, for example, an electrical-nose (E-nose) sensor, an electromyogram (EMG) sensor, an electroencephaloeram (EEG) sensor, an electrocardiogram (ECG) sensor, an infrared (IR) sensor, an iris sensor, and/or a fingerprint sensor. The sensor module 2400 may further include a control circuit for controlling one or more sensors included therein. According to some embodiments, the electronic device 2010 may further include a processor configured to control the sensor module 2400, as a part of or separately from the processor 2100. Thus, while the processor 2100 is in a sleep state, the control circuit may control the sensor module 2400.

The input device 2500 may include, for example, a touch panel 2520, and may further includes at least one of a (digital) pen sensor 2540, a key 2560, or an ultrasonic input device 2580. The touch panel 2520 may operate in at least one of, for example, capacitive, resistive, infrared, and ultrasonic schemes. The touch panel 2520 may further include a control circuit. The touch panel 2520 may further include a tactile layer to thereby provide haptic feedback to the user.

The (digital) pen sensor 2540 may include, for example, a detection sheet which is a part of the touch panel or separately configured from the touch panel. The key 2560 may include, for example, a physical button, an optical key, or a keypad. The ultrasonic input device 2580 may sense ultrasonic signals generated by an input tool using a microphone (for example, a microphone 2880), and identify data corresponding to the sensed ultrasonic signals.

The display 2600 (for example, the display 1600) may include a panel 2620, and may further includes a hologram device 2640 and/or a projector 2660. The panel 2620 may have the same configuration as or a similar configuration to the display 1600 illustrated in FIG. 1. The panel 2620 may be configured to be, for example, flexible, transparent, or wearable. The panel 2620 and the touch panel 2520 may be implemented as one module. The hologram device 2640 may utilize the interference of light waves to provide a three-dimensional image in empty space. The projector 2660 may display an image by projecting light on a screen. The screen may be positioned, for example, inside or outside the electronic device 2010. According to an embodiment, the display 2600 may further include a control circuit for controlling the panel 2620, the hologram device 2640, or the projector 2660.

The interface 2700 may include at least one of, for example, an HDMI 2720, a USB 2740, an optical interface 2760, or a D-subminiature (D-sub) 2780. The interface 2700 may be included, for example, in the communication interface 1700 illustrated in FIG. 1. Additionally or alternatively, the interface 2700 may include, for example, a mobile high-definition link (MHL) interface, an SD/multimedia card (MMC) interface, or an infrared data association (IrDA) interface.

The audio module 2800 may, for example, convert a sound to an electrical signal, and vice versa. At least a part of the components of the audio module 2800 may be included, for example, in the I/O interface 1500 illustrated in FIG. 1. The audio module 2800 may process sound information input into, or output from, for example, a speaker 2820, a receiver 2840, an earphone 2860, or the microphone 2880.

The camera module 2910 may capture, for example, still images and a video. According to an embodiment, the camera module 2910 may include one or more image sensors (for example, a front sensor or a rear sensor), a lens, an image signal processor (ISP), or a flash (for example, an LED or a xenon lamp).

The power management module 2950 may manage power of, for example, the electronic device 2010. According to an embodiment, the power management module 2950 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 2960. The battery 2960 may include, for example, a rechargeable battery and/or a solar battery.

The indicator 2970 may indicate specific states of the electronic device 2010 or a part of the electronic device 2010 (for example, the processor 2100), for example, boot status, message status, or charge status. The motor 2980 may convert an electrical signal to a mechanical vibration, and generate vibrations or haptic effects. While not shown, the electronic device 2010 may include a mobile TV support device (for example, a GPU). The mobile TV support device may process media data compliant with, for example, digital multimedia broadcasting (DMB), digital video broadcasting (DVB), or MediaFLO™.

Each of the above-described components of the electronic device may include one or more parts and the name of the component may vary with the type of the electronic device. According to various embodiments, some component may be omitted from or added to the electronic device. Further, one entity may be configured by combining a part of the components of the electronic device, to thereby perform the same functions of the components prior to the combining.

Figure 9:
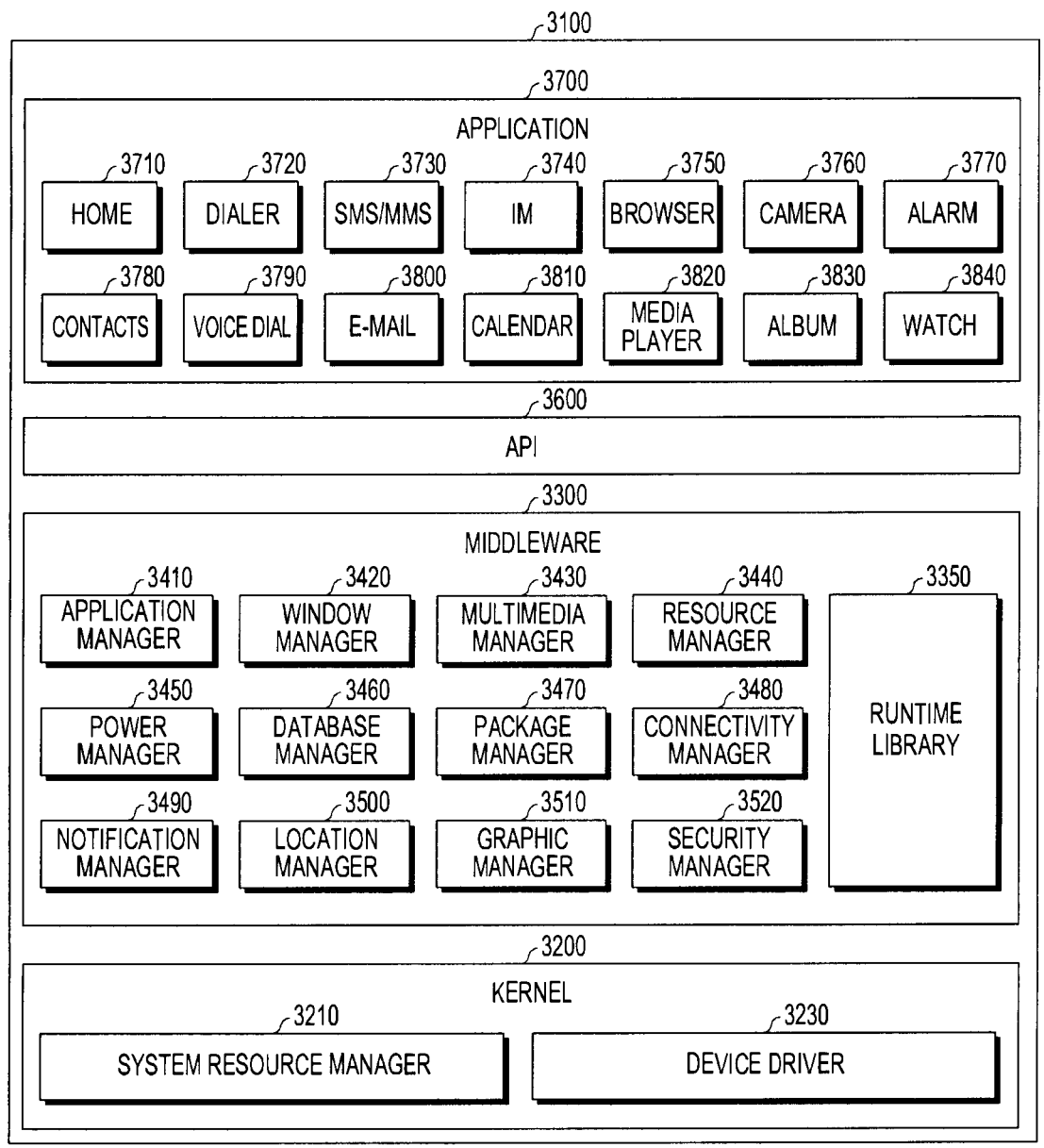
FIG. 9 is a block diagram of a programming module according to various embodiments.

FIG. 9 is a block diagram of a programming module according to various embodiments. According to an embodiment, a programming module 31000 (for example, a program 1400) may include an OS that controls resources related to an electronic device (for example, the electronic device 1010) and/or various applications executed on the OS (for example, the application programs 1470). For example, the OS may be Android™, iOS™, Windows™, Symbian™, Tizen™, or Bada™.

The programming module 3100 may include a kernel 3200 (for example, the kernel 1410), middleware 3330, an application programming interface (API) 360 (for example, the API 1450), and/or applications 3700. At least a part of the programming module 3100 may be preloaded on the electronic device or downloaded from an external electronic device (for example, the electronic device 1020 or 1040, or the server 1060).

The kernel 3200 (for example, the kernel 1410) may include, for example, a system resource manager 3210 and/or a device driver 3230. The system resource manager 3210 may control, allocate, or deallocate system resources. According to an embodiment, the system resource manager 3210 may include a process manager, a memory manager, or a file system manager. The device driver 3230 may include, for example, a display driver, a camera driver, a Bluetooth driver, a shared memory driver, a USB driver, a keypad driver, a WiFi driver, an audio driver, or an inter-process communication (IPC) driver.

The middleware 3330 may, for example, provide a function required commonly for the applications 3700 or provide various functionalities to the applications 3700 through the API 360 so that the applications 3700 may use limited system resources available within the electronic device. According to an embodiment, the middleware 3330 (for example, the middleware 1430) may include at least one of a runtime library 335, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, or a security manager 3520.

The runtime library 335 may include, for example, a library module that a complier uses to add a new function in a programming language during execution of an application 3700. The runtime library 335 may perform input/output management, memory management, or arithmetic function processing.

The application manager 3410 may manage, for example, the life cycle of at least one of the applications 3700. The window manager 3420 may manage GUI resources used for a screen. The multimedia manager 3430 may determine formats required to play back media files and may encode or decode a media file using a CODEC suitable for the format of the media file. The resource manager 3440 may manage resources such as a source code of at least one of the applications 3700, a memory, or a storage space.

The power manager 3450 may, for example, manage a battery or a power source in conjunction with a basic input/output system (BIOS) and provide power information required for an operation of the electronic device. The database manager 3460 may, for example, generate, search, or modify a database to be used for at least one of the applications 3700. The package manager 3470 may manage installation or update of an application distributed as a package file.

The connectivity manager 3480 may manage wireless connectivity such as WiFi or Bluetooth. The notification manager 3490 may display or indicate an event such as message arrival, a schedule, a proximity notification, or the like in a manner that does not bother the user. The location manager 3500 may mange position information about the electronic device. The graphic manager 3510 may manage graphical effects to be provided to the user or related user interfaces. The security manager 3520 may provide overall security functions required for system security or user authentication. According to an embodiment, if the electronic device (for example, the electronic device 101) includes a telephony function, the middleware 3300 may further include a telephony manager to manage a voice or video call function of the electronic device.

The middleware 3330 may include a middleware module for combining functions of the above-described components. The middleware 3330 may provide a customized module for each OS type. Further, the middleware 3300 may dynamically delete a part of the existing components or add a new component.

The API 360 (for example, the API 1450) is, for example, a set of API programming functions, which may be configured differently according to an OS. For example, in the case of Android or iOS, one API set may be provided per platform, whereas in the case of Tizen, two or more API sets may be provided per platform.

The applications 3700 (for example, the application programs 1470) may include, for example, home 3710, dialer 3720, short message service/multimedia messaging service (SMS/MMS) 3730, instant message (IM) 3740, browser 3750, camera 3760, alarm 3770, contacts 3780, voice dial 3790, email 3800, calendar 3810, media player 3820, album 3830, watch 3840, health care (for example, measurement of an exercise amount or a glucose level), or an application for providing environment information (for example, information about atmospheric pressure, humidity, or temperature).

According to an embodiment, the applications 3700 may include an application supporting information exchange (hereinafter, referred to as an "information exchange application") between the electronic device (for example, the electronic device 1010) and an external electronic device (for example, the electronic device 1020 or 1040). The information exchange application may include, for example, a notification relay application for transmitting specific information to the external electronic device or a device management application for managing the external electronic device.

For example, the notification relay application may transmit notification information generated from another application (for example, the SMS/MMS application, the email application, the health care application, or the environment information application) of the electronic device to the external electronic device (for example, the electronic device 1020 or 1040). Further, the notification relay application may receive notification information, for example, from the external electronic device and transmit the received notification information to a user.

The device management application may manage (for example, install, delete, or update) at least one function of the external electronic device (for example, the electronic device 1020 or 1040) communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment, the applications 3700 may include (an application (for example, a health care application of a mobile medical equipment) designated according to a property of the external electronic device (for example, the electronic device 1020 or 1040). According to an embodiment, the applications 3700 may include an application received from an external electronic device (for example, the server 1060 or the electronic device 1020 or 1040). According to an embodiment, the applications 3700 may include a preloaded application or a third party application which may be downloaded from a server. The names of the components of the programming module 3100 according to the illustrated embodiment may vary according to an OS type.

At least a part of the programming module 3100 may be realized in software, firmware, hardware, or a combination of at least two of them. At least a part of the programming module 3100 may be implemented (for example, executed) by, for example, a processor (for example, the processor 2100). At least a part of the programming module 3100 may include, for example, a module, a program, a routine, a set of instructions, or a process to execute one or more functions.

The present disclosure and the embodiments of the present disclosure illustrated in the drawings are specific examples presented to describe and help understanding of the present disclosure, not limiting the scope of the present disclosure. Therefore, it is to be understood that various changes in form and details may be made therein without departing from the spirit and scope of the disclosure as defined by the appended claims and their equivalents.

The invention claimed is:

1. A super wide-angle optical system comprising:
a first lens group including a negative refractive power; and
a second lens group including a positive refractive power, the first lens group and the second lens group arranged sequentially from an object side; and
a structure between the first lens group and the second lens group, configured to restrict a size of one of an aperture and a luminous flux,
wherein the first lens group includes a plurality of meniscus lenses convex toward an object, a meniscus lens concave toward the object side, next to the plurality of meniscus lenses arranged sequentially from the object side, and a lens closest to an image in the first lens group, the lens closest to the image in the first lens group being a positive lens,
wherein the second lens group includes a cemented lens of a lens including a positive refractive power and a lens including a negative refractive power bonded to each other, arranged sequentially from the object side, and a lens closest to the image in the second lens group, the lens closest to the image in the second lens group being a lens including a positive refractive power, and
wherein cemented lenses are absent in the first lens group.

2. The super wide-angle optical system of claim 1, wherein a meniscus lens closest to the image among the plurality of meniscus lenses convex toward the object in the first lens group includes a non-spherical surface.

3. The super wide-angle optical system of claim 1, wherein the lens closest to the image in the first lens group including a non-spherical surface.

4. The super wide-angle optical system of claim 1, wherein the lens closest to the image in the second lens group including a non-spherical surface.

5. The super wide-angle optical system of claim 1, wherein a field of view of the super wide-angle optical system satisfies the following condition, $$190 \leq Wfov \qquad \text{[Conditional formula]}$$

wherein the Wfov of the Conditional formula represents a maximum field of view.

6. The super wide-angle optical system of claim 1, wherein a field of view, an image height, and a focal length of the super wide-angle optical system satisfy the following condition, $$\frac{y}{2\sin\frac{\theta}{2}} \geq f \geq \frac{y}{2\tan\frac{\theta}{2}} \qquad \text{[Conditional formula]}$$

wherein the θ of the Conditional formula represents a half field of view, the y of the Conditional formula represents the image height (a distance from a center of an image to an outermost periphery of the image), and the f of the Conditional formula represents the focal length.

* * * * *